United States Patent
Choi

(10) Patent No.: US 10,091,491 B2
(45) Date of Patent: Oct. 2, 2018

(54) DEPTH IMAGE GENERATING METHOD AND APPARATUS AND DEPTH IMAGE PROCESSING METHOD AND APPARATUS

(71) Applicant: SAMSUNG ELECTRONICS CO., LTD., Suwon-si (KR)

(72) Inventor: Ouk Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 591 days.

(21) Appl. No.: 13/900,746

(22) Filed: May 23, 2013

(65) Prior Publication Data
US 2013/0321584 A1    Dec. 5, 2013

(30) Foreign Application Priority Data

Jun. 5, 2012  (KR) .................... 10-2012-0060616

(51) Int. Cl.
*G06F 17/00*     (2006.01)
*H04N 13/254*    (2018.01)
(Continued)

(52) U.S. Cl.
CPC ........... *H04N 13/254* (2018.05); *G01S 17/89* (2013.01); *H04N 13/0253* (2013.01)

(58) Field of Classification Search
CPC ........ G01S 17/08; G01S 7/481; G01S 7/4914; G01S 17/42; G01S 7/4865; G06T 2207/10028; G06T 2200/08; G06T 7/593; G06T 2207/10021; G06T 2207/20221; G06T 7/55; G06T 2207/10012; G06T 3/4038; H04N 13/0271; H04N 2013/0081; H04N 5/2256; H04N 5/23232; G02B 19/0066; G02B 19/009; G01C 3/08; A61B 1/05; A61B 1/0638; A61B 1/0684;
(Continued)

(56) References Cited

U.S. PATENT DOCUMENTS 5,699,444 A    12/1997 Palm
6,122,042 A *  9/2000 Wunderman .......... A61B 1/05
                                                356/343
(Continued)

FOREIGN PATENT DOCUMENTS

CN    102017147 A    4/2011
EP    1515541 A2     3/2005
(Continued)

OTHER PUBLICATIONS

Pixel; Webopedia, http://www.webopedia.com/TERM/P/pixel.html, Downloaded Nov. 6, 2015, p. 1.*
(Continued)

*Primary Examiner* — Dave Czekaj
*Assistant Examiner* — Alison Slater
(74) *Attorney, Agent, or Firm* — Harness, Dickey & Pierce, P.L.C.

(57) ABSTRACT

A depth image generation method is provided. The depth image generation method may include emitting light of different modulation frequencies to an object; detecting the light of the different modulation frequencies reflected from the object; and generating a depth image related to a distance to the object using the light of the different modulation frequencies.

17 Claims, 19 Drawing Sheets

(51) Int. Cl.
  *H04N 13/02* (2006.01)
  *G01S 17/89* (2006.01)
(58) Field of Classification Search
  CPC .............. A61B 5/0059; G01N 21/3151; G06K 7/10722; G06K 7/10732
  See application file for complete search history.

(56) References Cited

U.S. PATENT DOCUMENTS

| | | | |
|---|---|---|---|
| 6,424,422 | B1 | 7/2002 | Kamon et al. |
| 7,791,715 | B1* | 9/2010 | Bamji ................... G01C 3/08 356/4.01 |
| 2007/0064976 | A1 | 3/2007 | England, III ............ G01C 3/08 382/106 |
| 2008/0277473 | A1* | 11/2008 | Kotlarsky .......... G06K 7/10722 235/462.07 |
| 2010/0118142 | A1 | 5/2010 | Ohsawa |
| 2011/0234756 | A1* | 9/2011 | Adler ..................... G06T 5/002 348/46 |
| 2011/0309236 | A1* | 12/2011 | Tian .................. H01L 27/14603 250/208.1 |
| 2011/0317878 | A1* | 12/2011 | Kang ..................... G01S 17/89 382/106 |
| 2012/0033045 | A1* | 2/2012 | Schweizer ............ G01S 7/4912 348/46 |
| 2012/0051588 | A1* | 3/2012 | McEldowney ........ G03B 17/54 382/103 |

FOREIGN PATENT DOCUMENTS

| | | |
|---|---|---|
| EP | 2 395 475 A1 | 12/2011 |
| JP | 2006-285946 | 10/2006 |
| KR | 10-0513055 | 8/2005 |
| KR | 10-0748719 | 8/2007 |
| KR | 10-0930286 | 11/2009 |
| KR | 10-2010-00081197 | 7/2010 |
| KR | 10-2011-0052993 | 5/2011 |
| KR | 10-2011-0064622 | 6/2011 |
| KR | 2012-0000299 A | 1/2012 |

OTHER PUBLICATIONS

Distance; Oxford Dictionaries, http://www.oxforddictionaries.com/us/definition/american_english/distance, Downloaded Nov. 6, 2015, entire document.*

European Search Report dated Feb. 12, 2014 in corresponding European Patent Application 13170490.0.

Partial European Search Report dated Sep. 10, 2013 in corresponding European Application No. 13170490.

U.S. Appl. No. 13/064,096, filed Mar. 4, 2011, Ouk Choi et al, Samsung Electronics Co., Ltd.

Office Action for Corresponding Chinese Patent Application No. 201310222197.9 dated Apr. 7, 2017 and English translation thereof.

David Droeschel et al., "Probabilistic Phase Unwrapping for Time-of- Flight Garners", XP-002660845, Munich, Germany, Jun. 7, 2010 pp. 318-324.

Office Action for Corresponding Korean Patent Application No. 10-2012-0060616 dated Nov. 8, 2017 and English translation thereof.

European Search Report for European Patent Application No. 11165279.8 dated Nov. 7, 2011.

David Droeschel et al., "Probabilistic Phase Unwrapping for Time-of-Flight Garners", XP-002660845, Munich, Germany, Jun. 7, 2010 pp. 318-324.

Xianyu Su et al., "Dynamic 3-D Shape measurement method: A review", Optics and Lasers in Engineering, China, vol. 48, Feb. 1, 2010, pp. 191-204.

Elena Stoykova eta., "3-D Time-Varying Scene Capture Technologies—A Survey", IEEE Transactions on Circuits and Systems for Video Technology, vol. 17, No. 11, Nov. 1, 2007, pp. 1568-1586.

Andrew D. Payne et al., "Multiple Frequency Range Imaging to Remove Measurement Ambiguity", XP-002660844, New Zealand, Jul. 1-3, 2009, pp. 139-148.

Shane H. McClure et al., "Resolving depth measurement ambiguity with commercially available range imaging cameras", XP-002660846, New Zealand, vol. 7538, 2010, pp. 75380K-1-75380K-12.

D. Falie et al., "Wide Range Time of Flight Camera for Outdoor Surveillance", MRRS-2008, Romania, Sep. 22, 2008, pp. 79-82.

* cited by examiner

DEPTH IMAGE GENERATING METHOD AND APPARATUS AND DEPTH IMAGE PROCESSING METHOD AND APPARATUS

CROSS-REFERENCE TO RELATED APPLICATIONS

This application claims the priority benefit of Korean Patent Application No. 10-2012-0060616, filed on Jun. 5, 2012, in the Korean Intellectual Property Office, the disclosure of which is incorporated herein by reference.

BACKGROUND

1. Field

One or more example embodiments of the following description relate to a depth image generating method and apparatus and a depth image processing method and apparatus, and more particularly, to a method for generating a depth image using light of different modulation frequencies and a method of processing the generated depth image.

2. Description of the Related Art

According to one technique, a depth image may be generated by calculating a distance to an object using a time required for light to reflect from the object and to return. Currently, a time-of-flight (ToF) camera that generates a depth image using the foregoing technique is widely used. The ToF camera calculates the distance to the object using a phase delay that occurs when frequency-modulated light is reflected.

A maximum measurable distance ("$r_{max}$") between the object and the ToF camera is determined by a modulation frequency used for the calculating. For example, in calculating the above-referenced phase delay, a phase difference between the emitted light and reflected light in the time-of-flight is calculated to be within a period of 0 to $2\pi$ radians. $r_{max}$ denotes a maximum distance measurable without ambiguity, which is called a non-ambiguous distance range. Thus an object having a distance of $r_{max}$ from the ToF camera corresponds to a phase difference of $2\pi$ radians. When the phase difference is greater than $2\pi$, such as for an object located farther away from the ToF camera than $r_{max}$, the phase difference will still be measured as falling between 0 and $2\pi$ radians. Such as phenomenon may be referred to as "phase wrapping." Thus, the measured phase difference will be smaller than an actual phase difference thereby corresponding to some distance less than $r_{max}$. Therefore, the conventional ToF camera may incorrectly determine a depth image of an object located further than a maximum measurable distance to be within a measurable distance range.

To restore a depth value of an object located a greater distance than $r_{max}$ from the depth image, a single depth image or a plurality of depth images may be used. When using a single depth image, a number of mods of a pixel having a small depth value is set to be greater by one than a number of mods of a pixel having a large depth value, at a discontinuous part of the depth image. When using a plurality of depth images, the plurality of depth images may be obtained by moving a camera.

SUMMARY

The foregoing and/or other aspects are achieved by providing a depth image generation method including emitting light of different modulation frequencies to an object; detecting the light of the different modulation frequencies reflected from the object; and generating a depth image related to a distance to the object using the light of the different modulation frequencies.

The foregoing and/or other aspects are also achieved by providing a depth image generation apparatus including an emission unit to emit light of different modulation frequencies to an object; a detection unit to detect the light of the different modulation frequencies reflected from the object; and a generation unit to generate a depth image related to a distance to the object using the light of the different modulation frequencies.

The foregoing and/or other aspects are also achieved by providing a depth image processing method including separating a depth image based on different modulation frequencies; restoring a depth value of the separated depth image by interpolation; and adjusting a depth value of a long distance using the depth image of which the depth value is restored.

The foregoing and/or other aspects are also achieved by providing a depth image processing apparatus including a separation unit to separate a depth image based on different modulation frequencies; a restoration unit to restore a depth value of the separated depth image by interpolation; and an adjustment unit to adjust a depth value of a long distance using the depth image of which the depth value is restored.

The depth image processing apparatus may further include a synthesizing unit to synthesize the depth image of which the depth value is adjusted.

The foregoing and/or other aspects are also achieved by providing a time of flight depth camera including a processor to control one or more processor-executable units, an emission unit comprising a plurality of first emitters emitting rays at a first modulation frequency and a plurality of second emitters emitting rays at a second modulation frequency, and a pixel array comprising a plurality of first pixels configured to sense the rays emitted at the first modulation frequency and a plurality of second pixels configured to sense the rays at the second modulation frequency.

In an embodiment of the time of flight depth camera, the first pixels and the second pixels are arranged alternately in a grid pattern.

The foregoing and/or other aspects are also achieved by providing a apparatus restoring a depth image including a processor to control one or more processor-executable units, a separation unit to extract a first depth image obtained at a first modulation frequency and a second depth image obtained at a second modulation frequency from a single depth image having image portions obtained at each of the first modulation frequency and the second modulation frequency, a restoration unit to restore a depth value in each of the first depth image and the second depth image using interpolation, and an adjustment unit to adjust a long distance depth based on the first depth image having the restored depth value and the second depth image having the restored depth value.

The foregoing and/or other aspects are also achieved by providing a depth image generating and processing system including a processor to control one or more processor-executable units, an emission unit to emit light at different modulation frequencies toward an object, a detection unit to detect the light at the different modulation frequencies reflected from the object, a separation unit to separate a depth image based on the detected light at the different modulation frequencies, a restoration unit to restore an absent depth value of the separated depth image by interpolation, and an adjustment unit to adjust a depth value of a long distance using the depth image having the restored depth value.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
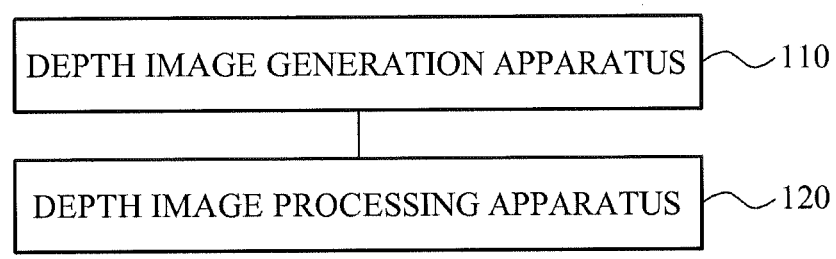
FIG. 1 illustrates an overall structure of a system for processing a depth image according to example embodiments.

Reference will now be made in detail to example embodiments, examples of which are illustrated in the accompanying drawings, wherein like reference numerals refer to the like elements throughout. A depth image generation method according to the example embodiments may be performed by a depth image generation apparatus according to the example embodiments. Also, a depth image processing method according to the example embodiments may be performed by a depth image processing apparatus according to the example embodiments.

FIG. 1 illustrates an overall structure of a system for processing a depth image according to example embodiments.

Referring to FIG. 1, the system for processing a depth image may include, for example, a depth image generation apparatus 110 and a depth image processing apparatus 120.

The depth image generation apparatus 110 may generate a depth image related to a distance to an object using light of different modulation frequencies. That is, the depth image generation apparatus 110 may determine the distance from the depth image generation apparatus 110 to the object by generating the depth image.

The modulation frequencies of the light may determine a maximum measurable distance ($r_{max}$) of the depth image generation apparatus 110. For example, when the depth image generation apparatus 110 photographs the object using light having a modulation frequency of about 30 MHz, the depth image generation apparatus 110 may measure a distance of about 5 m as $r_{max}$. In contrast, when the depth image generation apparatus 110 photographs the object using light having a different modulation frequency than 30 MHz, the depth image generation apparatus 110 may measure a distance different than 5 m as $r_{max}$.

The depth image processing apparatus 120 may process the depth image generated by the depth image generation apparatus 110 based on the different modulation frequencies. The depth image processing apparatus 120 may adjust a depth value of a long distance expressed in the depth image, using one depth image generated by the depth image generation apparatus 110. Therefore, the depth image processing apparatus 120 may be able to adjust the long distance depth value even with respect to a depth image obtained in a state in which the depth image generation apparatus 110 or the object is moving. Here, the term "long distance" will refer to a distance exceeding the maximum distance conventionally measurable without ambiguity of the depth image generation apparatus 110 and the term "long distance depth value" will refer to a depth value of a distance exceeding the maximum distance conventionally measurable without ambiguity.

The depth image processing apparatus 120 may match an actual distance to the object to the depth value expressed in the depth image, by adjusting the long distance depth value expressed in the depth image. In addition, the depth image processing apparatus 120 may synthesize the depth image generated based on the different modulation frequencies, thereby expressing a high definition depth image.

Figure 2:
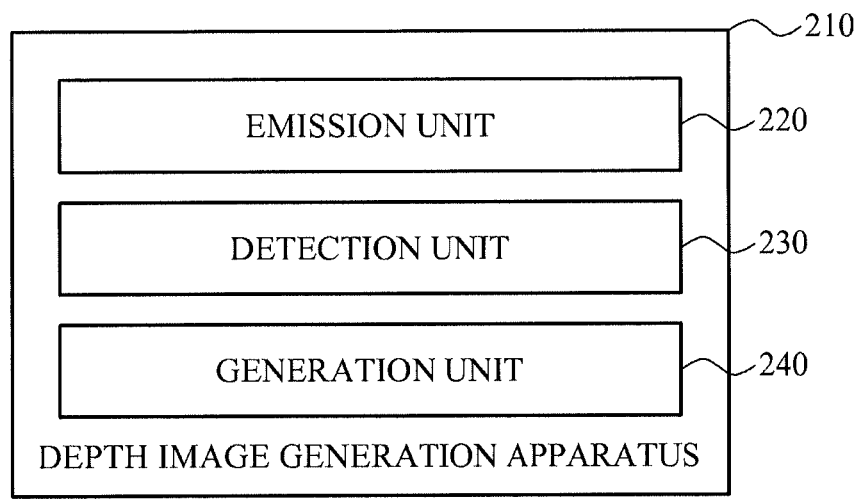
FIG. 2 illustrates a detailed structure of a depth image generation apparatus according to example embodiments.

FIG. 2 illustrates a detailed structure of a depth image generation apparatus 210 according to example embodiments.

Referring to FIG. 2, the depth image generation apparatus 210 may include, for example, an emission unit 220, a detection unit 230, and a generation unit 240.

The emission unit 220 may emit light of respectively different modulation frequencies to an object. That is, the emission unit 220 may emit light modulated at an arbitrary frequency. According to another example, the emission unit 220 may emit light output from a plurality of light sources each operating at different modulation frequencies toward the object. The plurality of light sources operating at different modulation frequencies may have any of a horizontal structure, a vertical structure, and a lattice structure. That is, the plurality of light sources operating at different modulation frequencies may have a spatially mixed structure.

Figure 4A:
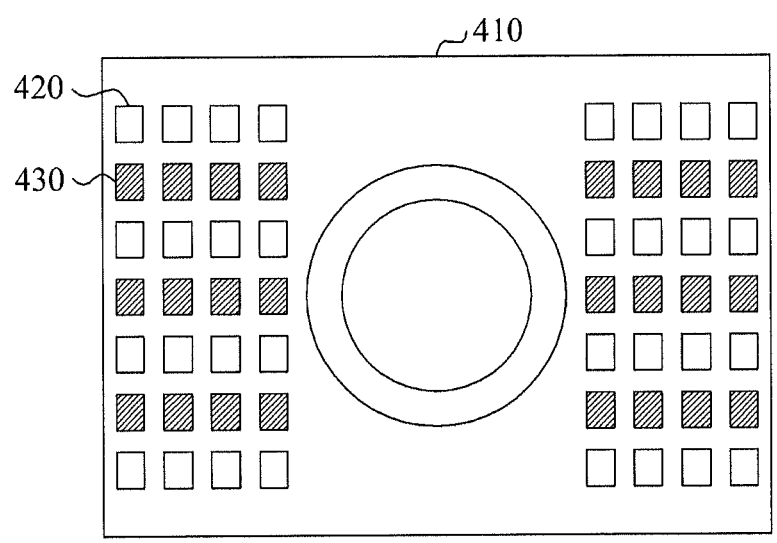
FIGS. 4A to 4C illustrate an example arrangement of light sources operating in respectively different modulation frequencies, according to example embodiments.
Figure 4B:
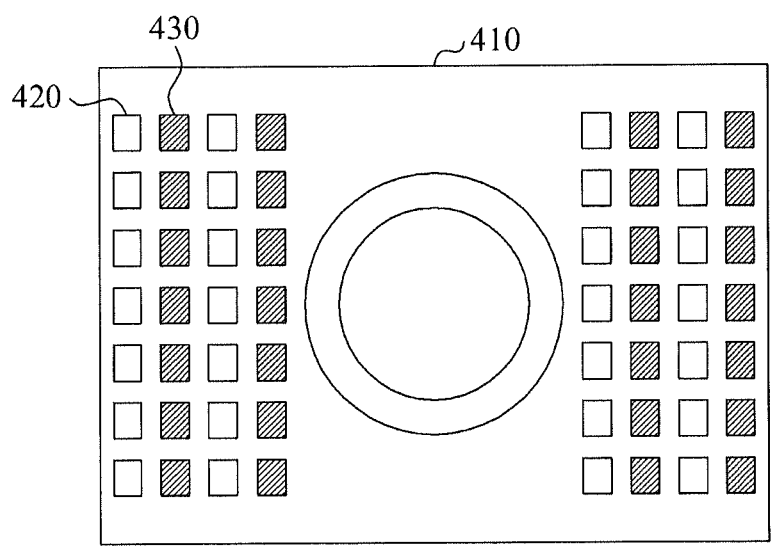
Figure 4C:
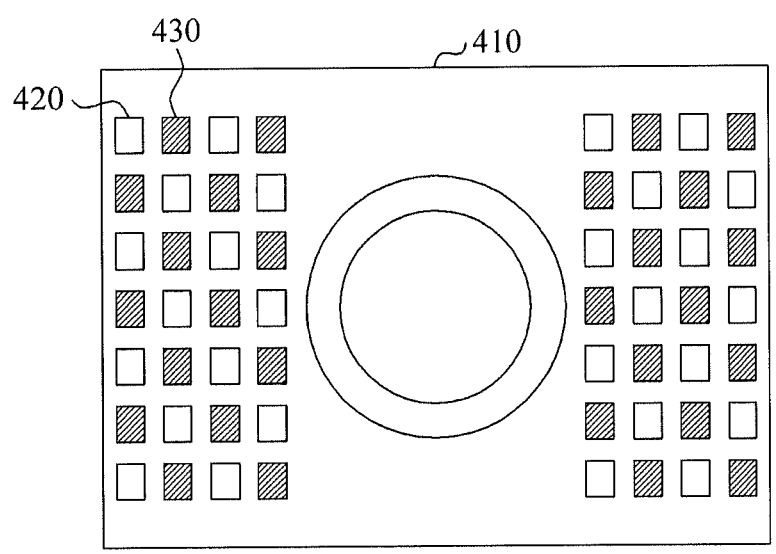

FIGS. 4A to 4C illustrate an example arrangement of light sources each operating at different modulation frequencies, according to example embodiments.

Referring to FIGS. 4A to 4C, a depth image generation apparatus 410 may include a light source 420 operating at an arbitrary modulation frequency f1 and a light source 430 operating at an arbitrary modulation frequency f2. The light source 420 operating at the modulation frequency f1 may emit light at the modulation frequency f1 toward an object. The light source 430 may emit light at the modulation frequency f2 toward the object.

The light sources 420 and 430 may be arranged in any of a horizontal structure shown in FIG. 4A, a vertical structure shown in FIG. 4B, and a lattice structure shown in FIG. 4C. The arrangement of the light sources 420 and 430 should not be limited however to the illustrated embodiments.

Referring again to FIG. 2, the detection unit 230 may detect the light of respectively different modulation frequencies reflected from the object. Alternatively, the detection unit 230 may detect the light using at least one pixel operating at respectively different modulation frequencies. The plurality of pixels operating at different modulation frequencies may have any of a horizontal structure, a vertical structure, and a lattice structure. That is, the plurality of pixels operating at different modulation frequencies may have a spatially mixed structure.

Each pixel operating in or at a predetermined modulation frequency may sample light of the corresponding modulation frequency.

Figure 5A:
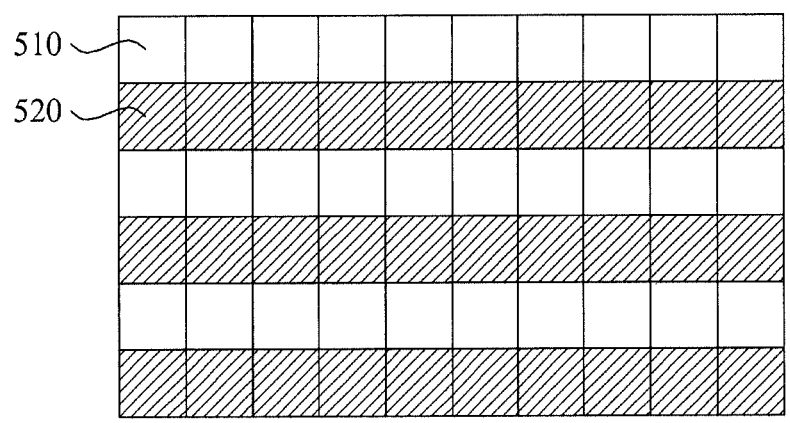
FIGS. 5A to 5C illustrate an example arrangement of pixels operating in respectively different modulation frequencies, according to example embodiments.
Figure 5B:
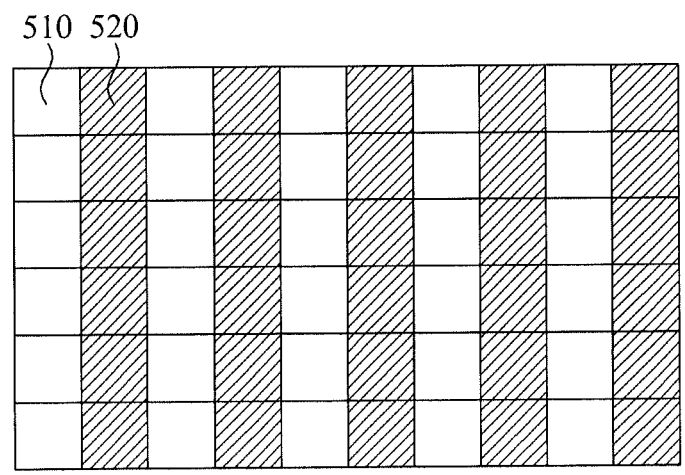
Figure 5C:
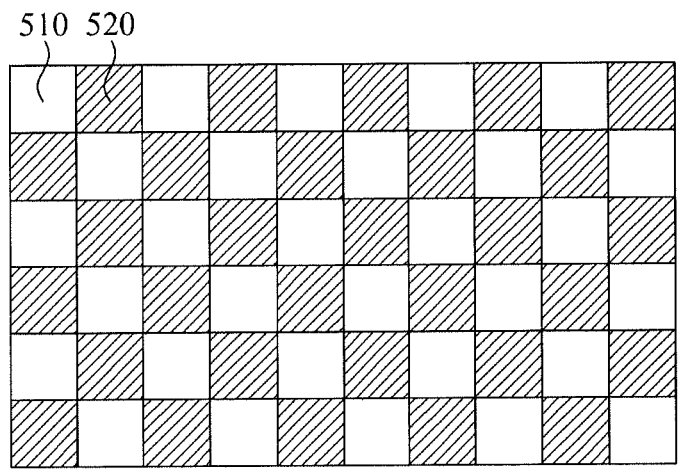

FIGS. 5A to 5C illustrate an example arrangement of pixels operating at respectively different modulation frequencies, according to example embodiments.

Referring to FIGS. 5A to 5C, a depth image generation apparatus may include a pixel 510 operating at an arbitrary modulation frequency f1 and a pixel 520 operating at an arbitrary modulation frequency f2. Light emitted from a light source may be reflected from an object and detected in the pixels 510 and 520. The pixel 510 operating at the modulation frequency f1 may detect light at the modulation frequency f1. The pixel 520 operating in the modulation frequency f2 may detect light at the modulation frequency f2.

The pixels 510 and 520 may be arranged in any of a horizontal structure shown in FIG. 5A, a vertical structure shown in FIG. 5B, and a lattice structure shown in FIG. 5C. The arrangement of the pixels 510 and 520 should not however be limited to the illustrated embodiments.

Referring again to FIG. 2, the generation unit 240 may generate a depth image related to the distance to the object using light at different modulation frequencies. In detail, the generation unit 240 may calculate the distance to the object using an intensity of light emitted to the object and an intensity of light reflected from the object. Alternatively, the generation unit 240 may calculate the distance to the object using a phase difference between the light emitted to the object and the light reflected from the object. The generation unit 240 may generate the depth image by adjusting brightness of an image based on a distance value. The generation unit 240 may generate a depth image related to the distance to the object from the light emission unit 220, for example.

Figure 3:
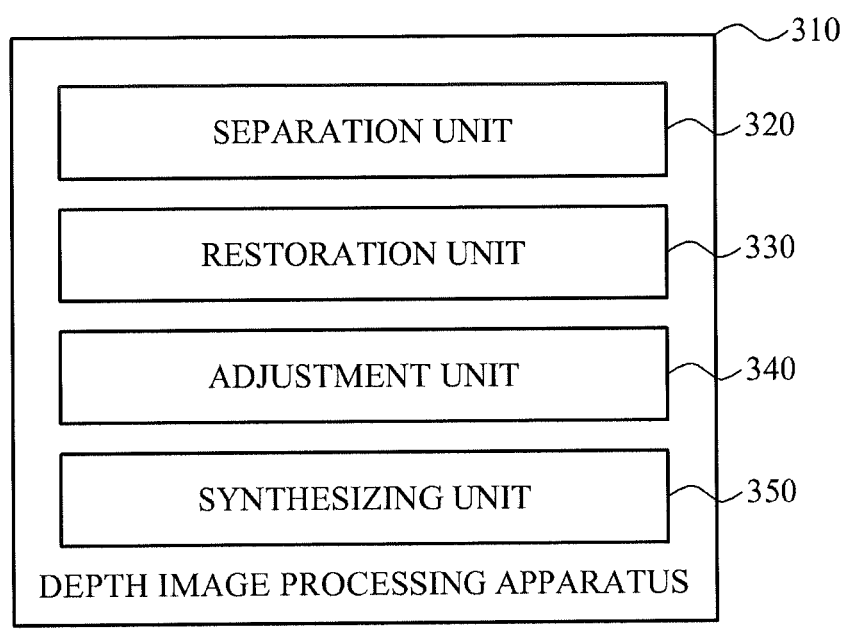
FIG. 3 illustrates a detailed structure of a depth image processing apparatus according to example embodiments.

FIG. 3 illustrates a detailed structure of a depth image processing apparatus 310 according to example embodiments.

Referring to FIG. 3, the depth image processing apparatus 310 may include, for example, a separation unit 320, a restoration unit 330, an adjustment unit 340, and a synthesizing unit 350.

The separation unit 320 may separate a depth image based on modulation frequencies. For example, the separation unit may separate a depth image into pixel regions corresponding to different modulation frequencies. As a further example, the separation unit 320 may separate pixels operating at the same modulation frequency from a pixel region generating one depth image from pixels having different modulation frequencies, thereby generating a new pixel region. The new pixel region may include pixels not having a depth value.

Figure 7:
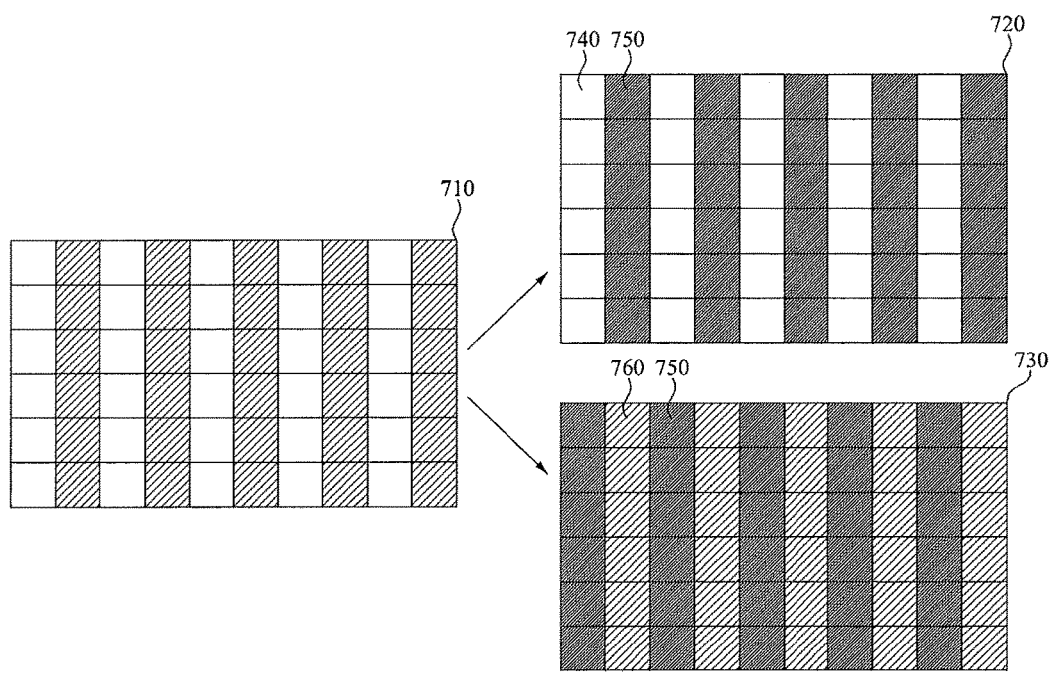
FIG. 7 illustrates an example in which a depth image is separated into pixel regions corresponding to the different modulation frequencies, according to example embodiments.

FIG. 7 illustrates an example in which a depth image has been separated into pixel regions corresponding to different modulation frequencies, according to example embodiments.

Referring to FIG. 7, a depth image processing apparatus may separate a pixel region 710 of a depth image generated using different modulation frequencies into pixel regions 720 and 730, each corresponding to the different modulation frequencies.

Pixel region 710 of the depth image generated by the depth image generation apparatus may include pixel 740 corresponding to a modulation frequency f1 and pixel 760 corresponding to a modulation frequency f2. The depth image processing apparatus may separate the pixel region 710 on the basis of the modulation frequency f1 and the modulation frequency f2. Pixel regions 720 and 730 separated according to the modulation frequencies may include a pixel 750 not having a depth value.

That is, pixels corresponding to the different modulation frequencies in the pixel regions 720 and 730 after being separated may include pixel 750 not having a depth value.

Referring again to FIG. 3, the restoration unit 330 may restore a depth value of either of the depth images separated based on the different modulation frequencies by interpolation. That is, the restoration unit 330 may restore a depth value of a current pixel not having the depth value in either of the depth images separated based on the different modulation frequencies. In detail, the restoration unit 330 may restore the depth value of the current pixel not having the depth value using depth values of peripheral pixels. Alternatively, the restoration unit 330 may restore the depth image of the current pixel by considering weights based on distances between the current pixel and peripheral pixels.

The restoration unit 330 may generate pixel regions independently according to the modulation frequencies, by generating a depth value of a pixel not having a depth value from the new pixel region generated by the separation unit 320. The restoration unit 330 will be discussed in more detail with respect to FIG. 8.

The adjustment unit 340 may adjust a long distance depth value using the depth image in which the depth value has been restored. In detail, the adjustment unit 340 may adjust the long distance depth value using a difference in 3-dimensional (3D) coordinate values of pixels corresponding to the same locations in each of the separated depth images.

A depth value of an object present at the long distance may be different from an actual depth value due to phase wrapping. For example, when the depth image generation apparatus is photographing an object located further than a maximum measureable distance ("$r_{max}$") of the depth image generation apparatus, phase wrapping may occur. In this case, the depth value of the object expressed in the depth image may be smaller than the actual depth value because the depth image generation apparatus considers the object, which is actually located further than $r_{max}$, to be within a measurable distance range. However, a depth value reflecting the phase wrapping may be actual depth value using a number of occurrences of the phase wrapping. For example, Equation 1 below calculates a depth value before phase wrapping has occurred, using a similar triangles formula in a 3D space.

$$X_i^f(n_i) = \frac{(\|X_i^f\| + n_i r_{max}^f)}{\|X_i^f\|} X_i^f \qquad \text{[Equation 1]}$$

$$r_{max}^f = \frac{c}{2f}$$

In Equation 1, $X_i^f$ may denote a 3D coordinate value measured with a modulation frequency f in an arbitrary pixel i and $X_i^f(n_i)$ may denote a 3D coordinate value before the phase wrapping occurs. $n_i$ denoting a positive number including 0 may represent a number of occurrences of phase wrapping in the arbitrary pixel i. In addition, c may denote a speed of light, $r_{max}^f$ may denote a maximum measurable distance of the depth image generation apparatus using light of the modulation frequency f, and $\|X_i^f\|$ may denote a distance from an origin to $X_i^f$ in the 3D space.

Since the pixels in the same locations in each of the separated depth images measure distances to the same locations, $X_i^{f_1}(n_i)$ and $X_i^{f_2}(m_i)$ may have the same value. Here, $n_i$ and $m_i$ may be positive numbers including 0. Accurate $n_i$ and $m_i$ values may minimize $\|X_i^{f_1}(n_i) - X_i^{f_2}(m_i)\|$ defined as a distance difference between $X_i^{f_1}(n_i)$ and $X_i^{f_2}(m_i)$.

$$D_i(n_i) = \min_{m_i \in \{0, \ldots, M\}} \|X_i^{f_1}(n_i) - X_i^{f_2}(m_i)\| \qquad \text{[Equation 2]}$$

Equation 2 may calculate a minimum value of $\|X_i^{f_1}(n_i) - X_i^{f_2}(m_i)\|$. Here, $D_i(n_i)$ may denote the minimum value of $\|X_i^{f_1}(n_i) - X_i^{f_2}(m_i)\|$. Presuming that may have any value from 0 to an arbitrary positive number M, $n_i$ minimizing $\|X_i^{f_1}(n_i) - X_i^{f_2}(m_i)\|$ may minimize $D_i(n_i)$.

$$n_i = \arg\min_{n_i \in \{0, \ldots, N\}} D_i(n_i) \qquad \text{[Equation 3]}$$

Presuming that $n_i$ may have any value from 0 to an arbitrary positive number N, Equation 3 may calculate $n_i$ that minimizes $D_i(n_i)$. That is, Equation 3 may be defined as an equation to calculate $n_i$ using $D_i(n_i)$.

Additionally, the adjustment unit 340 may adjust the long distance depth value, by considering weights based on depth values of the pixels corresponding to the same locations in each of the respective separated depth images and on depth values of peripheral pixels. $n_i$ of Equation 3 may be incorrectly calculated due to noise present in the depth images. To overcome this, the adjustment unit 340 may use Equation 4 below.

$$n_i = \operatorname{argmin}_{n_i \in \{0, \ldots, N\}} \sum_{j \in N_i} w_{ij} D_j(n_i) \qquad \text{[Equation 4]}$$

Equation 4 may calculate $n_i$ by considering the weights based on the depth values of the peripheral pixels so as to prevent incorrect calculation of $n_i$ caused due to the noise included in the depth image. That is, Equation 4 may be defined as an equation to calculate $n_i$ that minimizes $$\sum_{j \in N_i} w_{ij} D_j(n_i)$$

calculated in consideration of the weights based on the depth values of the peripheral pixels.

Presuming that peripheral pixels of the arbitrary pixel i have a value n corresponding to $n_i$ and that $n_i$ and n are equal, $n_i$ may be calculated using Equation 4. Here, Ni may refer to a set of the peripheral pixels including the pixel i. $w_{ij}$ may refer to a weight determined according to similarity between a depth value measured in the arbitrary pixel i and the depth value measured in a peripheral pixel j of the pixel i.

The adjustment unit 340 may adjust the long distance depth value by minimizing cost function value based on the difference in the 3D coordinate values of all pixels in each of the separated depth images. For example, the adjustment unit 340 may adjust the long distance depth value by calculating $n_i$ that minimizes the cost function value using Equation 5 and Equation 6.

$$E = \sum_i \sum_{j \in N_i} w_{ij} D_j(n_i) + \sum_{(i,j) \in N} V(n_i, n_j) \qquad \text{[Equation 5]}$$

$$E = \sum_i D_i(n_i) + \sum_{(i,j) \in N} V(n_i, n_j) \qquad \text{[Equation 6]}$$

In Equation 5 and Equation 6, V may denote a function determined based on similarity between $n_i$ and $n_j$ the pixel j corresponding to $n_i$. The function V may be an objective function that makes depth values of two neighboring pixels similar. The function V may be used for optimization in units of an entire image.

The foregoing process of calculating $n_i$ may be applied to calculation of $m_i$.

The adjustment unit 340 may calculate $n_i$ using Equation 4, Equation 5, and Equation 6. Also, the distance to the actual object may be calculated by adding the depth value measured in the pixel and a product of $n_i$ and $r_{max}^f$.

The synthesizing unit 350 may synthesize the depth value in which the long distance depth value has been adjusted. In detail, the synthesizing unit 350 may synthesize the depth image by combining depth values of non-interpolated pixels among pixels of the separate depth image. That is, the synthesizing unit 350 may adjust the long distance depth value using the depth image of which depth value is restored, and combine pixels having depth values from the first. Through the foregoing process, the synthesizing unit 350 may increase accuracy of a depth value at a boundary of the object or minimize noise of the depth image.

Figure 6:
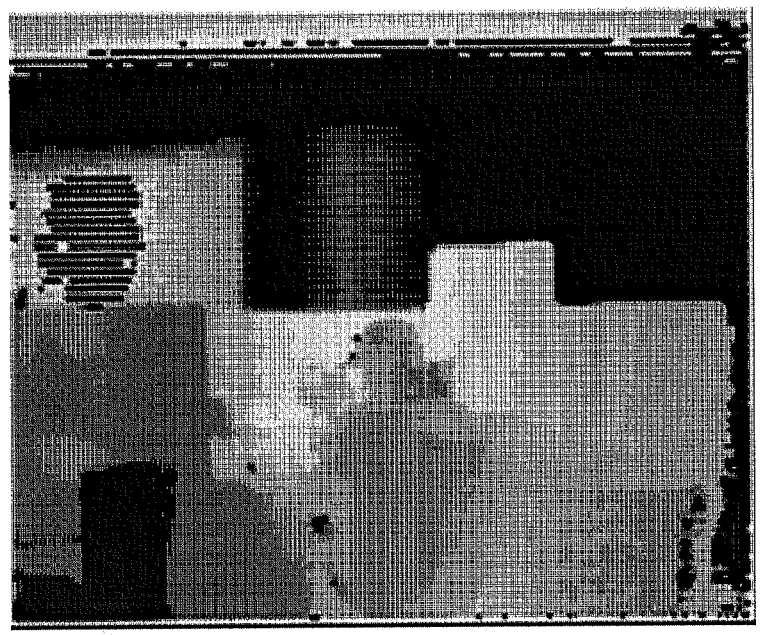
FIG. 6 illustrates an example depth image generated by a depth image generation apparatus according to example embodiments.

FIG. 6 illustrates an example depth image generated by a depth image generation apparatus according to example embodiments.

Referring to FIG. 6, a depth image generated by the depth image generation apparatus may express a distance to an object using brightness of the image. That is, as the distance to the object is shorter, the brightness may be decreased in the depth image of FIG. 6.

The depth image generated by the depth image generation apparatus may be expressed as a mixture of depth values calculated based on intensity of light measured in pixels. The depth image may include a region having a depth value different from an actual depth value due to phase wrapping. Therefore, processing for compensating the incorrect depth value to the actual depth value is necessitated.

Figure 8:
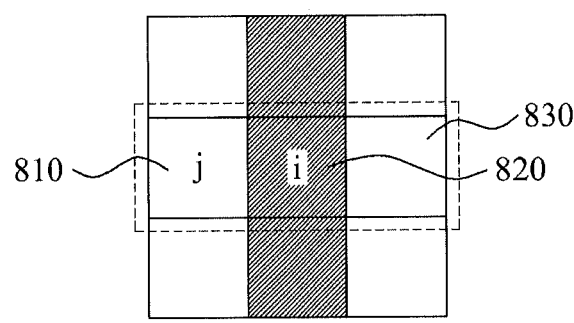
FIG. 8 illustrates an example in which a depth value is restored by interpolating a depth image, according to example embodiments.

FIG. 8 illustrates an example in which a depth value is restored by interpolating a depth image, such as by restoration unit 330, according to example embodiments.

Referring to FIG. 8, a depth image processing apparatus may calculate a depth value of a pixel 820 not having a depth value using peripheral pixels 810 and 830. For example, the depth image processing apparatus may calculate the depth value of the pixel 820 by considering weights based on distances between the pixel 820 not having the depth value and the peripheral pixels 810 and 830. However, the peripheral pixels are not limited to the peripheral pixels 810 and 830 but may include any pixel neighboring the pixel 820.

The depth value of the pixel 820 may be calculated using Equation 7 and Equation 8.

$$Z_i^{f_1} = \sum_{j \in N_i} w_{ij} Z_j^{f_1}$$ [Equation 7]

$$Z_i^{f_2} = \sum_{j \in N_i} w_{ij} Z_j^{f_2}$$ [Equation 8]

Equation 7 may calculate a depth value $Z_i^{f_1}$ of a z-axis direction measured in an arbitrary pixel i operating in a modulation frequency f1. Equation 8 may calculate a depth value $Z_j^{f_2}$ of the z-axis direction measured in an arbitrary pixel j operating in a modulation frequency f2. The z-axis direction may refer to a direction directed to a front side of a depth image generation apparatus. $w_{ij}$ may refer to a weight applied to a depth value of the pixel j to generate a depth value of the pixel i.

When the depth value in the z-axis direction is calculated, coordinates in the remaining directions, that is, an x-axis direction and a y-axis direction, of a 3D point may be calculated using an intrinsic parameter of a camera matrix.

Figure 9:
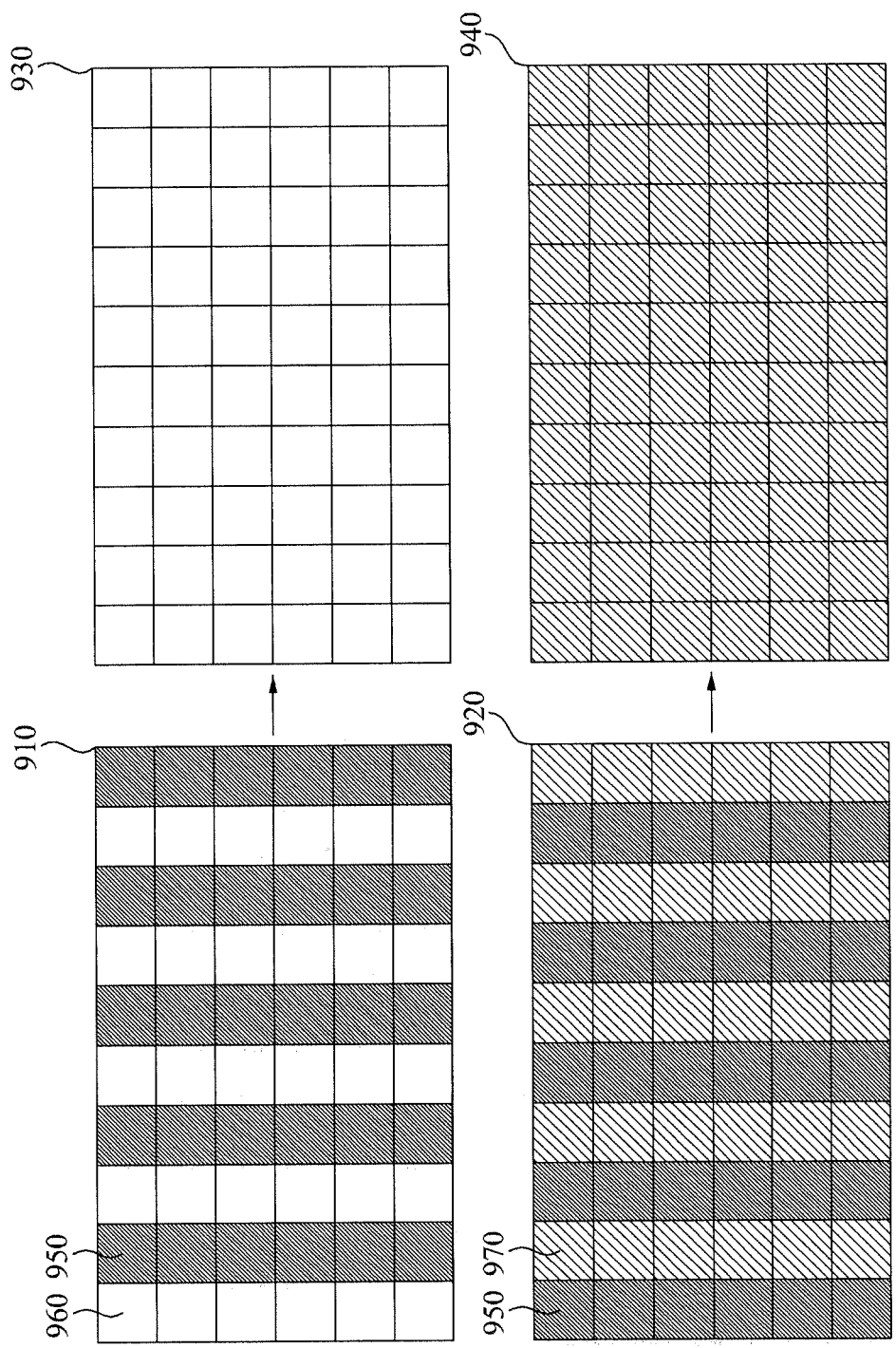
FIG. 9 illustrates an example of a pixel region of which a depth value is restored, according to example embodiments.

FIG. 9 illustrates an example of a pixel region of which a depth value is restored, according to example embodiments.

Referring to FIG. 9, a depth image processing apparatus may generate pixel regions 930 and 940 having depth values in an entire region by restoring a depth value of a pixel 950 not having the depth value.

A pixel region 910 may include both a pixel 960 corresponding to a modulation frequency f1 and the pixel 950 not having the depth value. A pixel region 920 may include both a pixel 970 corresponding to a modulation frequency f2 and the pixel 950 not having the depth value. The depth image processing apparatus may restore the depth value of the pixel 950 using depth values of peripheral pixels, or by considering weights based on a distance between the pixel 950 and the peripheral pixels.

Figure 10:
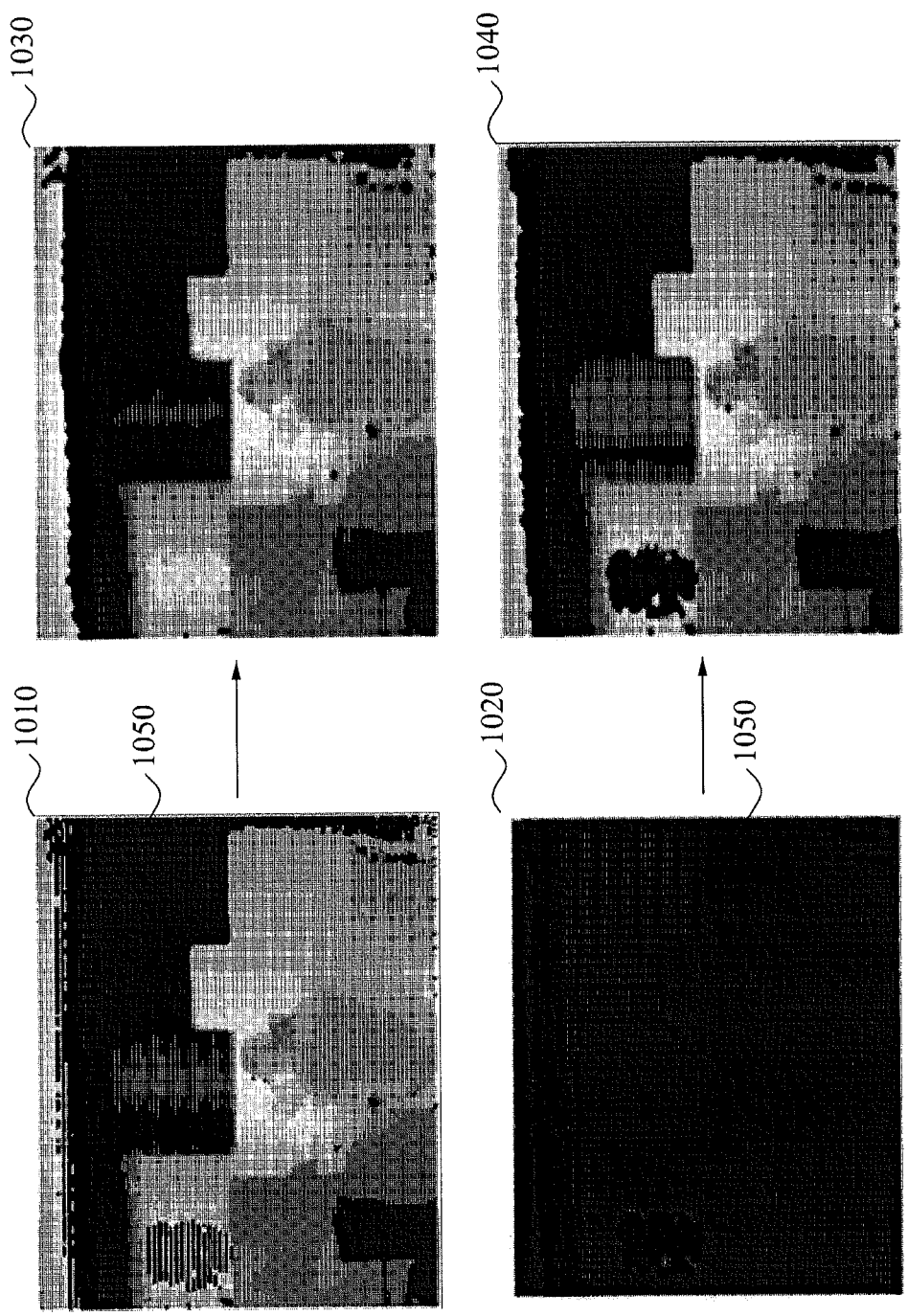
FIG. 10 illustrates an example of expressing a depth image by restoring a depth value of a pixel, according to example embodiments.

FIG. 10 illustrates an example of expressing a depth image by the pixel regions 910, 920, 930, and 940 of FIG. 9. The pixel regions 910 and 920 of FIG. 9 include the pixel 950 not having the depth value. Accordingly, depth images 1010 and 1020 expressing depth values of the pixel regions 910 and 920 may include a region 1050 in which a depth value is not expressed.

The depth image processing apparatus may restore the depth value of the pixel not having the depth value, thereby expressing a depth image having depth values in an entire region. The depth image having the depth values in the entire region through restoration of the depth value of the pixel not having the depth value is shown by depth images 1030 and 1040 in FIG. 10. The depth images 1030 and 1040 generated through restoration of the depth value may have the depth values even in the region 1050 in which the depth value is not expressed.

Figure 11:
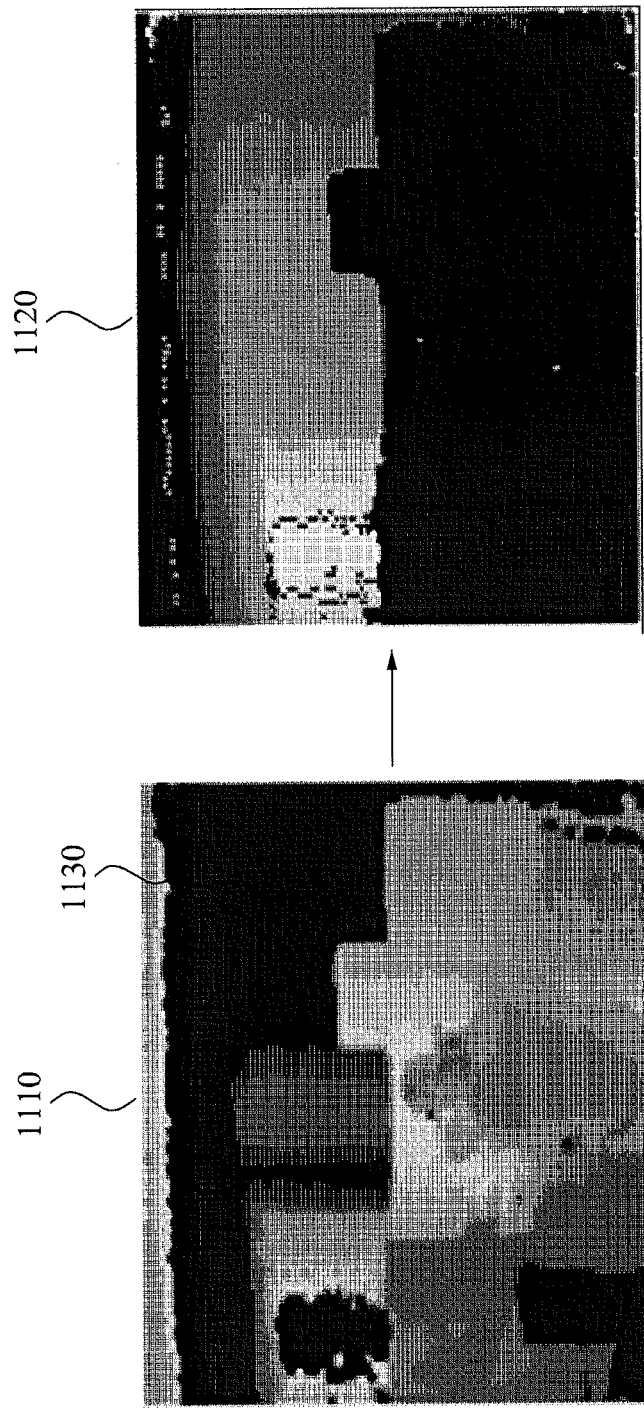
FIG. 11 illustrates an example of expressing a depth image by adjusting a depth value of a long distance, according to example embodiments.

FIG. 11 illustrates an example of expressing a depth image by adjusting a depth value of a long distance, according to example embodiments.

A depth image processing apparatus may restore a depth value of a pixel not having the depth value in a depth image separated based on different frequencies. The depth image 1110 of which the depth value is restored is shown in FIG. 11. In depth images 1110 and 1120 of FIG. 11, as a distance to an object is shorter, brightness is decreased. Presuming that a distance to the object is measured to be different from an actual distance in a region 1130 of the depth image 1110, the depth value needs to be adjusted to an actual depth value.

That is, in the region 1130 of the depth image 1110, the object may be expressed to be nearer although the object is actually located further than the measured distance. To compensate for the incorrect measurement, the depth image processing apparatus may adjust the long distance depth value using a difference in 3D coordinate values of pixels corresponding to the same locations in each of respective separated depth images. Alternatively, the depth image processing apparatus may adjust the long distance depth value by considering weights based on depth values of the pixels corresponding to the same locations in each of the respective separated depth images and on depth values of peripheral pixels.

A result of adjusting the depth value as aforementioned is shown in the depth image 1120. In the depth image 1120, the depth value of the region 1130 is adjusted. That is, since brightness is corrected according to the actual depth value, the region 1130 is shown bright in the depth image 1120.

Figure 12:
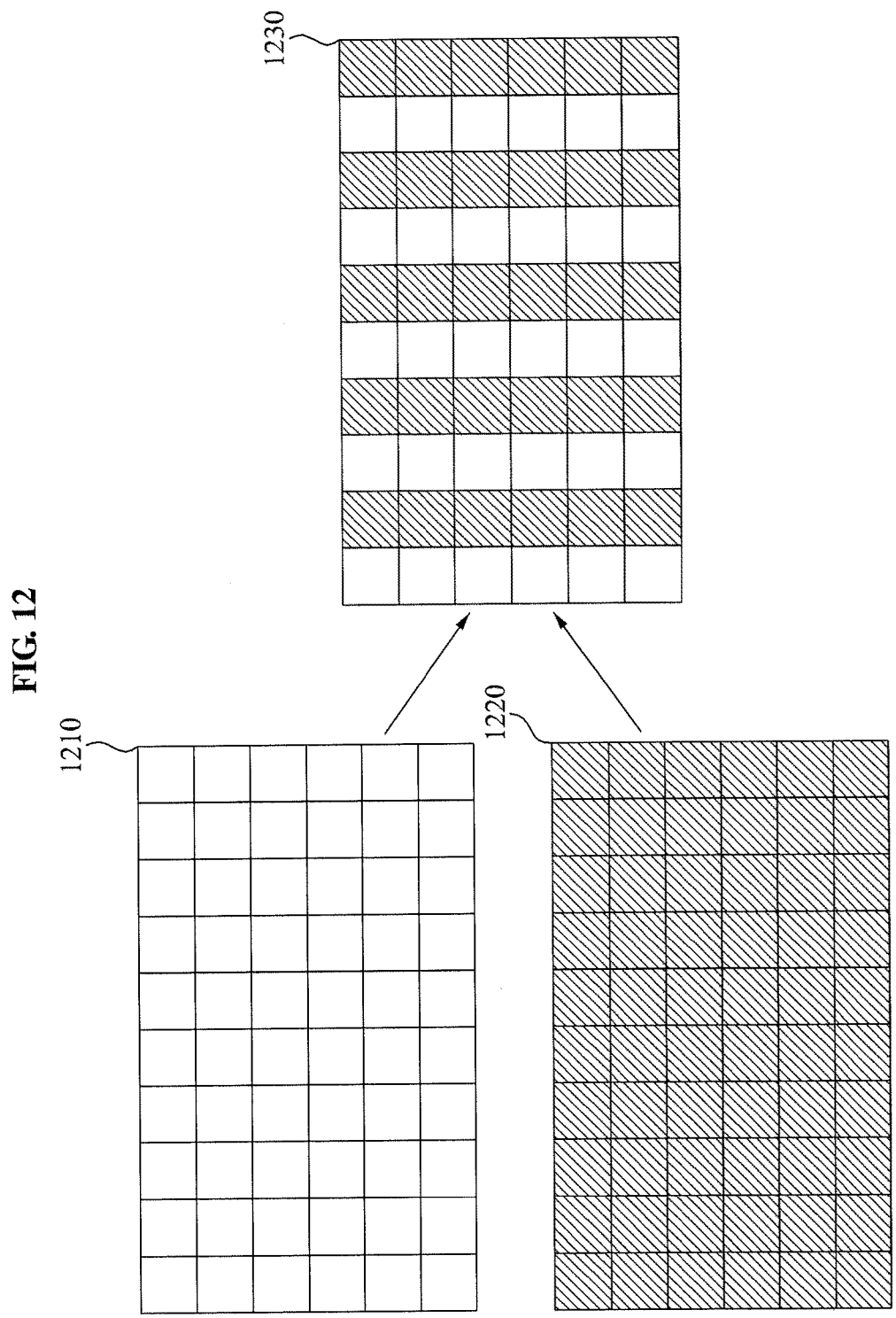
FIG. 12 illustrates an example of combining depth values of non-interpolated pixels among pixels of a depth image, according to example embodiments.

FIG. 12 illustrates an example of combining depth values of non-interpolated pixels among pixels of a depth image, according to example embodiments.

Referring to FIG. 12, a depth image processing apparatus may synthesize a new pixel region 1230 by combining the depth values of the non-interpolated pixels among the pixel regions 1210 and 1220 of a separated depth image. That is, the depth image processing apparatus may adjust a depth value of a long distance using a depth image of which a depth value is restored, and then combine pixels having depth values from the first. The pixel region 1230 newly generated by combining the depth values of the non-interpolated pixels may include pixels of which the long distance depth value is restored based on depth values of the peripheral pixels.

Figure 13:
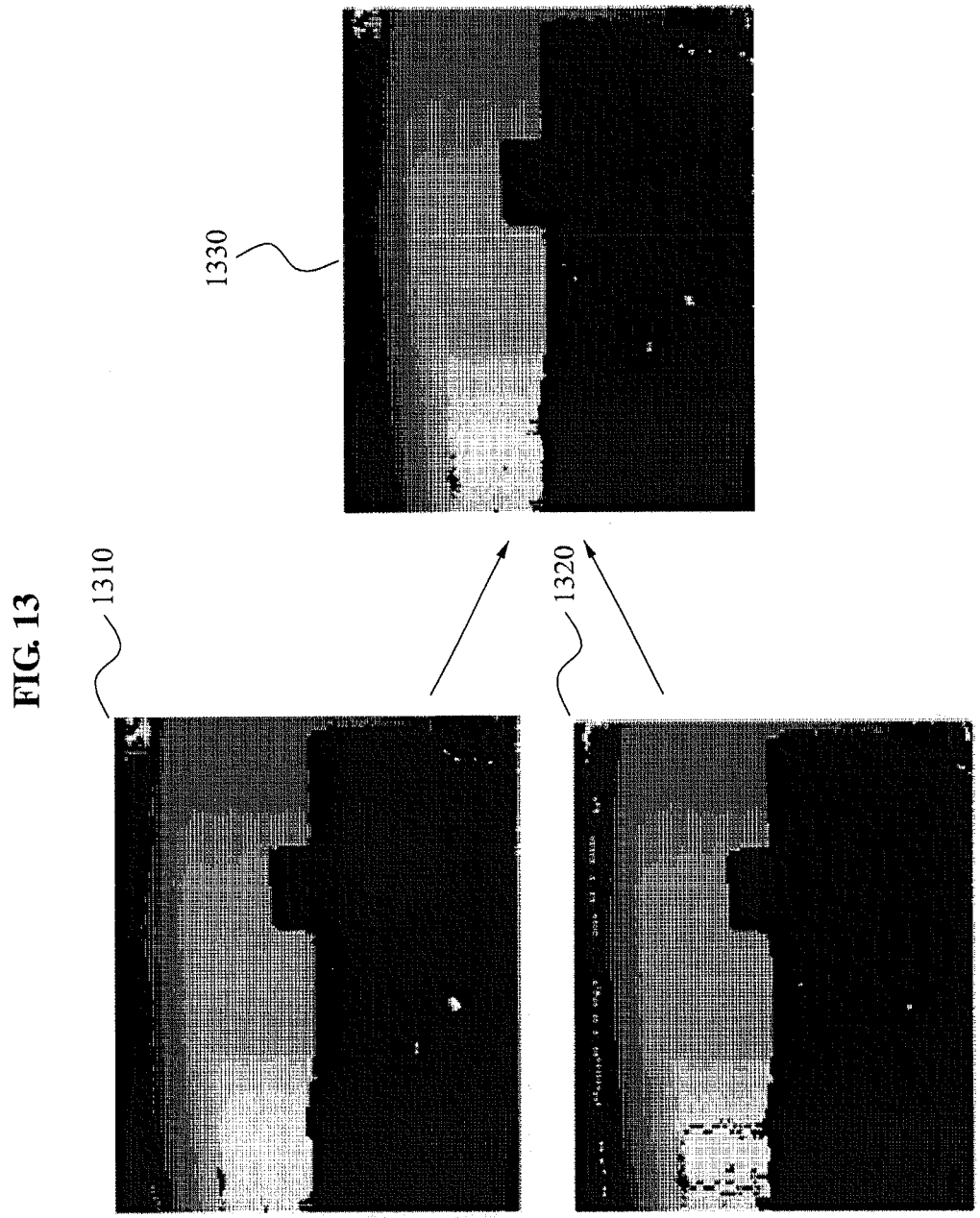
FIG. 13 illustrates an example of synthesizing a depth image of which a depth value of a long distance is adjusted, according to example embodiments.

FIG. 13 illustrates an example of expressing the pixel regions of FIG. 12 by a depth image, according to example embodiments. Depth images 1310, 1320, and 1330 of FIG. 13 may correspond to the pixel regions 1210, 1220, and 1230 of FIG. 12, respectively.

A depth image processing apparatus may increase accuracy of a depth value at a boundary by combining depth values of non-interpolated pixels. For example, the depth value at the boundary may have a significant error caused during interpolation of a depth value of the pixel not having the depth value. However, the depth image processing apparatus may more accurately express the depth value at the boundary by combining the depth values of pixels of which the depth values are not restored. In addition, through the foregoing method, the depth image processing apparatus may minimize noise of the depth value.

The depth images 1310 and 1320 may have an error at the boundary due to the pixels of which the depth values are restored. In detail, a change in the depth value may be greater at the boundary than at the other regions. Accordingly, when depth values of pixels not having the depth values are restored using depth values of peripheral pixels, the error in a depth value of a pixel adjacent to the boundary may be generated in the depth image.

To reduce the error, the depth image processing apparatus may express the depth image 1330 with a reduced error at the boundary, by combining the depth values of the pixels of which the depth values are not restored. In addition, the depth image processing apparatus may express a depth value having high definition depth value.

Figure 14:
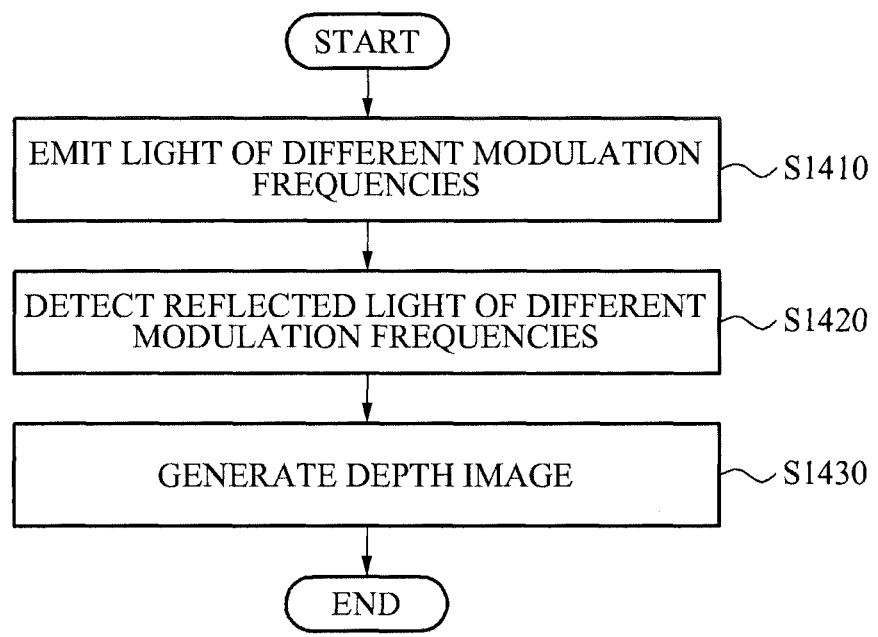
FIG. 14 illustrates an operation of generating a depth image according to example embodiments.

FIG. 14 is a flowchart illustrating an operation of generating a depth image according to example embodiments.

In operation 1410, a depth image generation apparatus may emit light at different modulation frequencies toward an object, or emit light output from at least one light source operating at different modulation frequencies to the object. The at least one light source operating at different modulation frequencies may have any structure of a horizontal structure, a vertical structure, and a lattice structure.

In operation 1420, the depth image generation apparatus may detect the light at the different modulation frequencies reflected from the object, or detect light using at least one pixel operating at different modulation frequencies. The at least one pixel operating at different modulation frequencies may have any structure of a horizontal structure, a vertical structure, and a lattice structure.

In operation 1430, the depth image generation apparatus may generate a depth image related to a distance to the object, using the light of the different modulation frequencies. The depth image generation apparatus may calculate the distance to the object using intensity of the light emitted to the object and intensity of the light reflected from the object.

Figure 15:
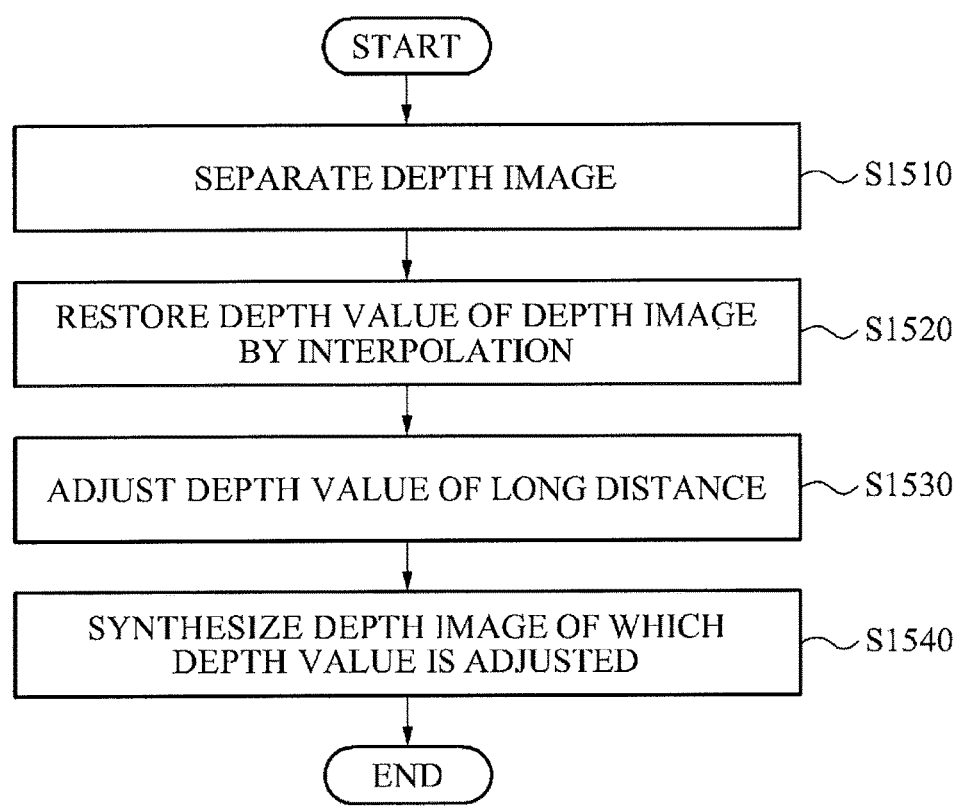
FIG. 15 illustrates an operation of processing a depth image according to example embodiments.

FIG. 15 is a flowchart illustrating an operation of processing a depth image according to example embodiments.

In operation 1510, a depth image processing apparatus may separate a depth image based on different modulation frequencies. For example, a depth image processing apparatus may generate two depth images obtained at different modulation frequencies using one dual-frequency depth image obtained from spatially mixed pixels sensing a signal at each of the different modulation frequencies. Alternatively, the depth image processing apparatus may separate a depth image into pixel regions corresponding to the different modulation frequencies.

In operation 1520, the depth image processing apparatus may restore a depth value of a depth image separated based on the different modulation frequencies by interpolation. In detail, the depth image processing apparatus may restore the depth value of a current pixel not having the depth value in the depth image separated based on the different modulation frequencies. Alternatively, the depth image processing apparatus may restore the depth value of the current pixel using peripheral pixels of the current pixel, or by considering weights based on distances between the current pixel and the peripheral pixels.

In operation 1530, the depth image processing apparatus may adjust a depth value of a long distance using the depth image of which the depth value is restored. In detail, the depth image processing apparatus may adjust the long distance depth value using a difference in 3D coordinate values of pixels corresponding to the same locations in each of the separated depth images. In addition, the depth image processing apparatus may adjust the long distance depth value in consideration of weights based on the depth values of the pixels corresponding to the same locations and the depth values of the peripheral pixels. Furthermore, the depth image processing apparatus may adjust the long distance depth value by minimizing a cost function value based on a difference in 3D coordinate values of all pixels in each of the separated depth images.

In operation 1540, the depth image processing apparatus may synthesize the depth image of which the long distance depth value has been adjusted. That is, the depth image processing apparatus may synthesize the depth image by combining depth values of non-interpolated pixels among the pixels of the separated depth image. Accordingly, the depth image processing apparatus may increase accuracy of the depth value at the boundary.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), arbitrary access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatusses described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A depth image generation method comprising:
simultaneously emitting, by first and second groups of light sources, light of different modulation frequencies to an object so that the first group of light sources emits first light at a first modulation frequency and the second group of light sources emits second light at a second modulation frequency;
detecting light using a pixel array that includes a first group of pixels interspersed with a second group of pixels,
the first group of pixels configured to sense light of the first modulation frequency by operating at the first modulation frequency,
the second group of pixels configured to sense light of the second modulation frequency by operating at the second modulation frequency,
the detecting including,
detecting a reflection of the first light from the object as first reflected light of the first modulation frequency using the first group of pixels, and
detecting a reflection of the second light from the object as second reflected light of the second modulation frequency using the second group of pixels; and
generating, by a processor, a dual-frequency depth image that includes a plurality of first frequency depth image pixels interspersed with a plurality of second frequency depth image pixels, the generating including,
  generating the plurality of first frequency depth image pixels based on the detected first reflected light of the first modulation frequency, and
  generating the plurality of second frequency depth image pixels based on the detected second reflected light of the second modulation frequency,
  wherein the plurality of first frequency depth image pixels and the plurality of second frequency depth image pixels are arranged in the dual-frequency depth image corresponding to an arrangement of the first group of pixels and the second group of pixels in a depth image generation apparatus.

2. The depth image generation method of claim 1, wherein the first and second groups of light sources are arranged in one of a horizontal structure, a vertical structure, and a lattice structure.

3. The depth image generation method of claim 1, wherein the first group of pixels and the second group of pixels have one of a horizontal structure, a vertical structure, and a lattice structure.

4. The depth image generation method of claim 1, wherein the generating of the depth image comprises:
  calculating a distance to the object using an intensity of the light emitted to the object and an intensity of the light reflected from the object.

5. A depth image processing method comprising:
  obtaining a dual-frequency depth image that includes a plurality of first frequency depth image pixels interspersed with a plurality of second frequency depth image pixels, the plurality of first frequency depth image pixels being image pixels generated based on light of a first modulation frequency sensed by a first group of pixels, the plurality of second frequency depth image pixels being image pixels generated based on light of a second modulation frequency sensed by a second group of pixels;
  separating, by a processor, the dual-frequency depth image into a first depth image and a second depth image such that the first depth image includes the plurality of first frequency depth image pixels and the second depth image includes the plurality of second frequency depth image pixels;
  restoring, by the processor, depth values of each of the first and second depth images using interpolation; and
  adjusting, by the processor, depth values of the dual-frequency depth image using the restored depth values
  wherein the plurality of first frequency depth image pixels and plurality of second frequency depth image pixels are arranged in the dual-frequency depth image corresponding to an arrangement of the first group of pixels and the second group of pixels in a depth image generation apparatus.

6. The depth image processing method of claim 5, wherein the restoring comprises restoring a depth value of a current depth image pixel with no depth value in the first depth image or in the second depth image using peripheral depth image pixels of the current depth image pixel.

7. The depth image processing method of claim 6, wherein the restoring comprises restoring the depth value of the current depth image pixel using weights based on distances between the current depth image pixel and the peripheral depth image pixels.

8. The depth image processing method of claim 5, wherein the adjusting includes adjusting the depth values using a difference in 3-dimensional (3D) coordinate values of depth image pixels corresponding to same locations in each of the first and second depth images.

9. The depth image processing method of claim 5, wherein the adjusting includes adjusting the depth values using weights based on depth values of depth image pixels corresponding to the same locations in each of the first and second depth images and depth values of peripheral depth image pixels.

10. The depth image processing method of claim 5, wherein the adjusting includes adjusting the depth values by minimizing a cost function value based on a difference in 3D coordinate values of all depth image pixels in each of the first and second depth images.

11. The depth image processing method of claim 5, further comprising:
  synthesizing each of the first and second depth images in which the depth values have been restored.

12. The depth image processing method of claim 11, wherein the synthesizing includes combining depth values of non-interpolated depth image pixels among depth image pixels of each of the first and second depth images.

13. A depth image generation apparatus comprising:
  first and second groups of light sources configured to simultaneously emit light of different modulation frequencies to an object so that the first group of light sources emits first light at a first modulation frequency and the second group of light sources emits second light at a second modulation frequency;
  a detector configured to,
    detect light using a pixel array that includes a first group of pixels interspersed with a second group of pixels,
    detect a reflection of the first light from the object as first reflected light of the first modulation frequency using the first group of pixels, and
    detect a reflection of the second light from the object as second reflected light of the second modulation frequency using a second group of pixels,
  the first group of pixels configured to sense light of the first modulation frequency by operating at the first modulation frequency,
  the second group of pixels configured to sense light of the second modulation frequency by operating at the second modulation frequency; and
  a processor configured to,
    generate a dual-frequency depth image that includes a plurality of first frequency depth image pixels interspersed with a plurality of second frequency depth image pixels,
    generate the plurality of first frequency depth image pixels based on the detected first reflected light of the first modulation frequency, and
    generate the plurality of second frequency depth image pixels based on the detected second reflected light of the second modulation frequency,
  wherein the plurality of first frequency depth image pixels and the plurality of second frequency depth image pixels are arranged in the dual-frequency depth image corresponding to an arrangement of the first group of pixels and the second group of pixels in a depth image generation apparatus.

14. The depth image generation apparatus of claim 13, wherein the first group of pixels and the second group of pixels are arranged alternately in a grid pattern.

15. The depth image generation method of claim 2, wherein the horizontal structure is a structure in which the first and second groups of light sources are alternately arranged in a first direction.

16. The depth image generation method of claim 15, wherein the vertical structure is a structure in which the first and second groups of light sources are alternately arranged in a second direction opposite to the first direction.

17. The depth image generation method of claim 16, wherein the lattice structure is a structure in which the first and second groups of light sources are arranged in a lattice pattern in the first and second directions.

* * * * *